United States Patent [19]
Johnson et al.

[11] Patent Number: 5,977,654
[45] Date of Patent: Nov. 2, 1999

[54] ANTI-THEFT SYSTEM FOR DISABLING A VEHICLE ENGINE THAT INCLUDES A MULTI-CONTACT SWITCH FOR DISCONNECTING THE BATTERY AND LOADING THE VEHICLE ELECTRICAL SYSTEM

[75] Inventors: Richard T. Johnson, Hubertus; William J. Wruck, Whitefish Bay; Majid Taghikhani, Franklin, all of Wis.

[73] Assignee: Johnson Controls Technology Company, Plymouth, Mich.

[21] Appl. No.: 08/949,290

[22] Filed: Oct. 13, 1997

Related U.S. Application Data

[63] Continuation-in-part of application No. 08/936,293, Sep. 25, 1997.

[51] Int. Cl.$^6$ .................................................. B60R 25/04
[52] U.S. Cl. .......................................... 307/10.3; 180/287
[58] Field of Search .................................. 307/10.2–10.6, 307/100; 340/425.5, 426, 825.31, 825.32, 825.34, 825.69, 825.72; 361/171, 172, 212, 217; 180/287

[56] References Cited

U.S. PATENT DOCUMENTS

| | | |
|---|---|---|
| 3,194,970 | 7/1965 | Claps . |
| 3,430,058 | 2/1969 | Yoshida . |
| 3,464,060 | 8/1969 | Arditti . |
| 3,634,724 | 1/1972 | Vest . |
| 3,922,996 | 12/1975 | Meyer . |
| 4,004,273 | 1/1977 | Kalogerson . |
| 4,023,138 | 5/1977 | Ballin . |
| 4,063,610 | 12/1977 | Shilling .................................. 307/10.2 |
| 4,159,467 | 6/1979 | Ballin . |
| 4,207,850 | 6/1980 | Wharton ........................... 123/146.5 B |
| 4,218,717 | 8/1980 | Shuster ........................................ 361/79 |
| 4,222,033 | 9/1980 | Brown . |
| 4,302,747 | 11/1981 | Belmuth . |

(List continued on next page.)

FOREIGN PATENT DOCUMENTS

| | | | |
|---|---|---|---|
| WO 86/07319 | 12/1986 | WIPO ............................ | B60R 25/04 |
| WO 93/13968 | 7/1993 | WIPO . | |
| WO 93/15935 | 8/1993 | WIPO ............................ | B60R 25/04 |
| WO 95/35228 | 12/1995 | WIPO ............................ | B60R 25/04 |
| WO 96/11817 | 4/1996 | WIPO . | |

OTHER PUBLICATIONS

PCT International Search Report dated Feb. 8, 1999 in Appln. No. PCT/US98/19380.

*Primary Examiner*—Richard T. Elms
*Attorney, Agent, or Firm*—Quarles & Brady LLP

[57] ABSTRACT

A vehicle anti-theft system that disables a vehicle engine upon detection of an unauthorized vehicle start-up, after the engine is running, by disconnecting the vehicle battery and draining the vehicle electrical system voltage to ground through a resistor. When the system is armed, it monitors whether the engine is running and has been recently started by detecting vibrations, fluctuations in the VES voltage, and the actual VES voltage. The system includes an electromechanical switch that has a battery internal contact, a vehicle electrical system, the standard battery external terminal, contact and a disconnect contact. When the switch is connected to the battery contact, the vehicle battery is connected in the circuit. When the switch is connected to the vehicle electrical system contact, the system is connected to ground through a resistance and the battery is disconnected from circuit. When the switch is connected to the disconnect contact, the battery is disconnected and the vehicle electrical system is not connected to ground. When the switch is not energized, it is either connected to the battery contact or the disconnect contact. When the switch is energized, the switch will switch to the vehicle electrical system contact, and then when it is deenergized, it will switch to the opposite battery contact or disconnect contact. The system includes logic so that if the engine is running and has been recently started when it is armed, the system will energize the switch to disconnect it from the battery contact and connect it to the vehicle electrical system contact for a predetermined time to drain the electrical system voltage to ground.

28 Claims, 6 Drawing Sheets

U.S. PATENT DOCUMENTS

| | | | |
|---|---|---|---|
| 4,305,004 | 12/1981 | Tanaka et al. | 307/100 |
| 4,317,108 | 2/1982 | Schwartz et al. . | |
| 4,452,197 | 6/1984 | Weber . | |
| 4,485,887 | 12/1984 | Morano | 180/287 |
| 4,507,644 | 3/1985 | Abrahamson | 180/287 |
| 4,549,090 | 10/1985 | Read | 180/287 |
| 4,553,127 | 11/1985 | Issa . | |
| 4,664,080 | 5/1987 | Minks . | |
| 4,721,872 | 1/1988 | Simmons | 307/10.1 |
| 4,754,159 | 6/1988 | Pointout et al. | 307/10.1 |
| 4,792,792 | 12/1988 | Costino | 180/287 |
| 4,821,017 | 4/1989 | Tanami et al. | 307/10.2 |
| 4,832,146 | 5/1989 | Luby | 180/287 |
| 4,902,956 | 2/1990 | Sloan . | |
| 4,958,084 | 9/1990 | Carlo et al. | 307/10.2 |
| 4,992,670 | 2/1991 | Pastor | 307/10.3 |
| 5,023,591 | 6/1991 | Edwards | 340/426 |
| 5,025,136 | 6/1991 | Doege et al. . | |
| 5,049,867 | 9/1991 | Stouffer | 340/426 |
| 5,059,945 | 10/1991 | Scheele et al. | 340/426 |
| 5,078,104 | 1/1992 | Peterson, Jr. | 123/179.4 |
| 5,089,762 | 2/1992 | Sloan . | |
| 5,094,199 | 3/1992 | Griffin | 123/179.1 |
| 5,128,551 | 7/1992 | Clokie | 307/10.1 |
| 5,130,659 | 7/1992 | Sloan | 324/435 |
| 5,132,551 | 7/1992 | Carlo et al. | 307/10.3 |
| 5,184,023 | 2/1993 | Carlo et al. | 307/10.3 |
| 5,191,228 | 3/1993 | Sloan | 307/10.3 |
| 5,200,877 | 4/1993 | Betton et al. | 361/92 |
| 5,287,006 | 2/1994 | Carlo et al. | 307/10.3 |
| 5,299,194 | 3/1994 | Ichii e al. | 370/85.3 |
| 5,332,958 | 7/1994 | Sloan . | |
| 5,360,997 | 11/1994 | Watson | 307/10.1 |
| 5,397,925 | 3/1995 | Carlo et al. | 307/10.3 |
| 5,404,129 | 4/1995 | Novak et al. | 340/428 |
| 5,408,211 | 4/1995 | Hall | 340/426 |
| 5,438,311 | 8/1995 | Lane, Sr. | 340/426 |
| 5,449,957 | 9/1995 | Carlo et al. | 307/10.3 |
| 5,481,253 | 1/1996 | Phelan et al. | 340/825.31 |
| 5,492,087 | 2/1996 | Rolland, Jr. | 123/146.5 B |
| 5,498,486 | 3/1996 | Gatehouse | 429/7 |
| 5,519,255 | 5/1996 | Burtch et al. | 307/10.2 |
| 5,519,376 | 5/1996 | Iijima | 340/426 |
| 5,528,085 | 6/1996 | Hsiang | 307/10.2 |
| 5,539,260 | 7/1996 | Khangura et al. | 307/10.3 |
| 5,552,642 | 9/1996 | Dougherty et al. | 307/10.3 |
| 5,554,891 | 9/1996 | Shimizu et al. | 307/10.2 |
| 5,572,185 | 11/1996 | Chen et al. | 340/425.5 |
| 5,576,686 | 11/1996 | Westermeir et al. | 340/426 |
| 5,581,231 | 12/1996 | Cardoso | 340/426 |
| 5,600,979 | 2/1997 | Winner et al. | 70/252 |
| 5,604,384 | 2/1997 | Carlo et al. | 307/10.5 |
| 5,623,245 | 4/1997 | Gilmore | 340/426 |
| 5,635,899 | 6/1997 | Carlo et al. | 340/426 |
| 5,635,901 | 6/1997 | Weinblatt | 340/426 |
| 5,637,929 | 6/1997 | Treharne | 307/10.5 |
| 5,638,270 | 6/1997 | Maeda et al. . | |
| 5,654,688 | 8/1997 | Allen et al. | 340/426 |
| 5,703,413 | 12/1997 | Treharne | 307/10.5 |
| 5,703,414 | 12/1997 | Mutoh et al. | 307/10.5 |
| 5,796,179 | 8/1998 | Honaga | 307/10.5 |

ANTI-THEFT SYSTEM FOR DISABLING A VEHICLE ENGINE THAT INCLUDES A MULTI-CONTACT SWITCH FOR DISCONNECTING THE BATTERY AND LOADING THE VEHICLE ELECTRICAL SYSTEM

CROSS-REFERENCE TO RELATED APPLICATIONS

This application is a continuation-in-part application of U.S. Ser. No. 08/936,293, filed Sept. 25, 1997, now pending.

BACKGROUND OF THE INVENTION

1. Field of the Invention

This invention relates generally to a vehicle anti-theft system for preventing theft of a vehicle and, more particularly, to a vehicle anti-theft system that disables the vehicle's engine after the engine is running, if an unauthorized vehicle start-up has occurred, by disconnecting the vehicle battery and draining the alternator voltage to ground.

2. Discussion of the Related Art

Theft of vehicles is a very significant and important problem facing vehicle owners. To address this problem, many different types of anti-theft systems that attempt to prevent a potential thief from stealing a vehicle are known in the art. However, as the sophistication of the anti-theft systems increases, the sophistication and ingenuity of the thieves also increases. The different types of anti-theft systems include steering wheel locks, alarm systems, and devices that disable certain essential components of the vehicle ignition system when an attempted theft is recognized. The systems that disable essential components of the vehicle ignition system generally include systems that interrupt the vehicle ignition circuit so as to prevent the vehicle from actually starting. One particular system includes providing an authorization circuit within the vehicle ignition key that is electrically coupled to the ignition circuit when the key is put into the ignition switch to provide a signal of an authorized user to enable the vehicle to be started.

Some of the known anti-theft systems attempt to prevent theft of a vehicle by disconnecting the vehicle battery from the ignition circuit to prevent the vehicle from being started, when an unauthorized ignition is detected. For example, U.S. Pat. No. 4,958,084 issued to Carlo et al. discloses an anti-theft device that prevents the vehicle from being started by disconnecting the vehicle battery from the ignition circuit upon detection of a high current flow indicative of an attempt to start the vehicle. The Carlo anti-theft device includes a power switch having a first condition connecting the battery to the ignition circuit to allow the battery to deliver power to the ignition circuit and a second condition that disconnects the battery from the ignition circuit. The power switch is shifted from the first condition to the second condition in response to a flow of a substantial amount of current through the ignition circuit that shows an attempt to start the vehicle. An externally received coded command signal from a hand-held transmitter deactivates the shifting of the power switch to the second condition when the high current flow is detected to enable the authorized user to start the vehicle.

The Carlo anti-theft system suffers from a number of drawbacks that can be improved upon. For example, because the Carlo anti-theft system senses the large amount of current (about 800 amps) that is present during ignition just prior to starting the vehicle engine, high integrity and robust mechanical elements are necessary to disconnect the vehicle battery at that time. Therefore, the Carlo power switch must be a heavy-duty and expensive mechanical switch. Further, because the Carlo anti-theft system only disconnects the battery from the ignition circuit to prevent the engine from being started, the system is susceptible to jump starting to complete the theft, where a second battery is connected to the vehicle starting system. The second battery would not be disconnected from the starting circuit by the anti-theft system. Also, because modern vehicles usually start very quickly after the ignition key has been turned, the chance that the Carlo anti-theft system will be able to sense the high current in time to prevent the vehicle engine from starting in these vehicles is reduced.

What is needed is an anti-theft system that disables a vehicle engine by disconnecting the battery from the vehicle ignition system, but does not suffer from the drawbacks discussed above. It is therefore an object of the present invention to provide such an anti-theft system.

SUMMARY OF THE INVENTION

In accordance with the teachings of the present invention, a vehicle anti-theft system is disclosed that disables a vehicle engine upon detection of an unauthorized vehicle start-up, after the engine is running, by disconnecting the vehicle battery and draining the VES voltage to ground through a resistor. A fob transmitter transmits a coded frequency signal that is received by a receiver associated with the anti-theft system. If the system is armed, the signal will cause the system to become disarmed so that the engine can be freely started. If the system is disarmed, the signal will cause the system to become armed. When the system is armed, it monitors whether the engine is running and has been recently started by detecting vibrations, fluctuations in the VES voltage, and the actual VES voltage. In accordance with one embodiment, the anti-theft system includes an electromechanical switch that has a battery contact, a VES contact through a standard battery external terminal, and a disconnect contact. When the switch is connected to the battery contact, the vehicle battery is connected in circuit. When the switch is connected to the VES contact, the VES is connected to ground and the battery is disconnected from circuit. When the switch is connected to the disconnect contact, the battery is disconnected and the VES is not connected to ground.

When the switch is not energized, it is either connected to the battery contact or the disconnect contact. When the switch is energized, the switch will be switched to the VES contact, and then when it is deenergized, it will switch to the opposite battery contact or disconnect contact. The system includes logic so that if the engine is running and has been recently started when it is armed, the system will energize the switch to disconnect it from the battery contact and connect it to the VES contact for a predetermined time to drain the VES voltage to ground. The logic tests the VES voltage at the positive battery external terminal when the switch is switched from the battery contact to test whether a second battery has been connected to the vehicle electrical system, such as during a jump start, and prevents the switch from remaining energized if the VES voltage is above a predetermined value.

A driver entry detection portion of the system determines whether someone has entered the vehicle, and issues a chirp signal to notify the occupant that the system is armed. A state of charge algorithm is also provided to determine whether the battery state of charge (SOC) has reached a minimum safe SOC for reliably starting the vehicle. The algorithm disconnects the battery through the switch once the minimum SOC has been reached.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to an anti-theft system that prevents vehicle theft by disabling the vehicle engine after it has been started is merely exemplary in nature and is in no way intended to limit the invention or its applications or uses.

Figure 1:
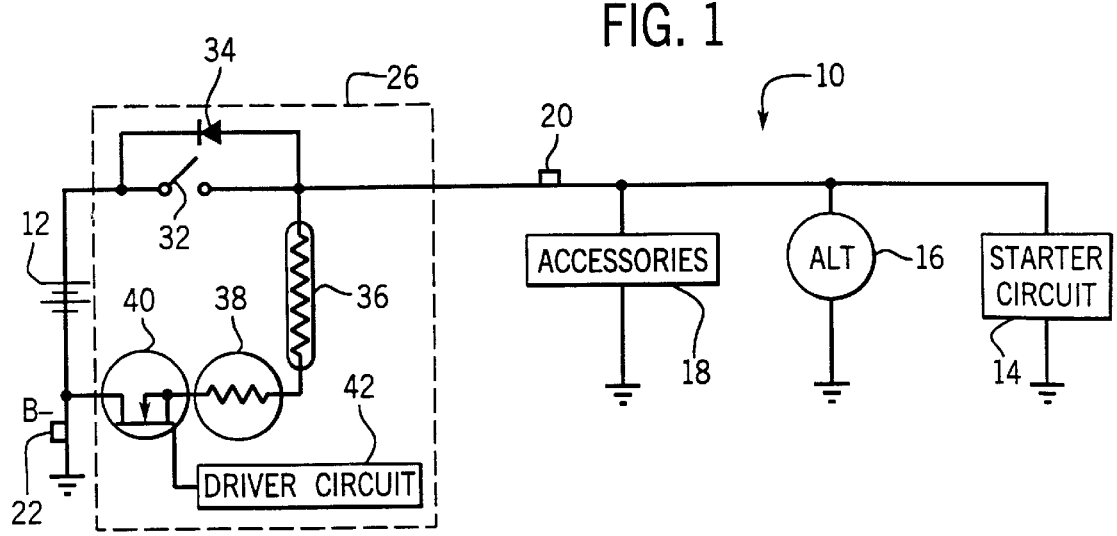
FIG. 1 is a schematic block diagram of a vehicle anti-theft system that disables the vehicle engine after it has been started, according to one embodiment of the present invention.

FIG. 1 is a schematic block diagram of a vehicle electrical system (VES) 10 of a vehicle (not shown) that includes a vehicle battery 12 for storing electrical power, a starter circuit 14, an alternator 16 and electrical accessories 18. The battery 12 is a typical 12-volt lead acid battery of the type used in most vehicles, and its operation and configuration is well known in the art. The battery 12 includes a positive battery terminal post 20 that is connected to a positive battery cable (not shown) and a negative battery terminal post 22 that is connected to a negative battery cable (not shown). The voltage of the VES 10 is provided at the positive post 20. Each of the starter circuit 14, the alternator 16 and the electrical accessories 18 are connected in parallel with the battery 12. The starter circuit 14 typically would include an ignition switch (not shown) and a starting motor (not shown) which operate to turn a flywheel (not shown) under power from the battery 12 when the ignition switch is closed to start the vehicle engine (not shown). The alternator 16 provides electrical power to the various vehicle electrical systems once the vehicle engine is operating, and recharges the battery 12. The vehicle electrical accessories 18 can be any other electrical device or system in the vehicle, such as headlights, dome light, radio, horn, clock, etc. The operation of the starter circuit 14, the alternator 16 and the electrical accessories 18 are well known in the art.

Figure 2:
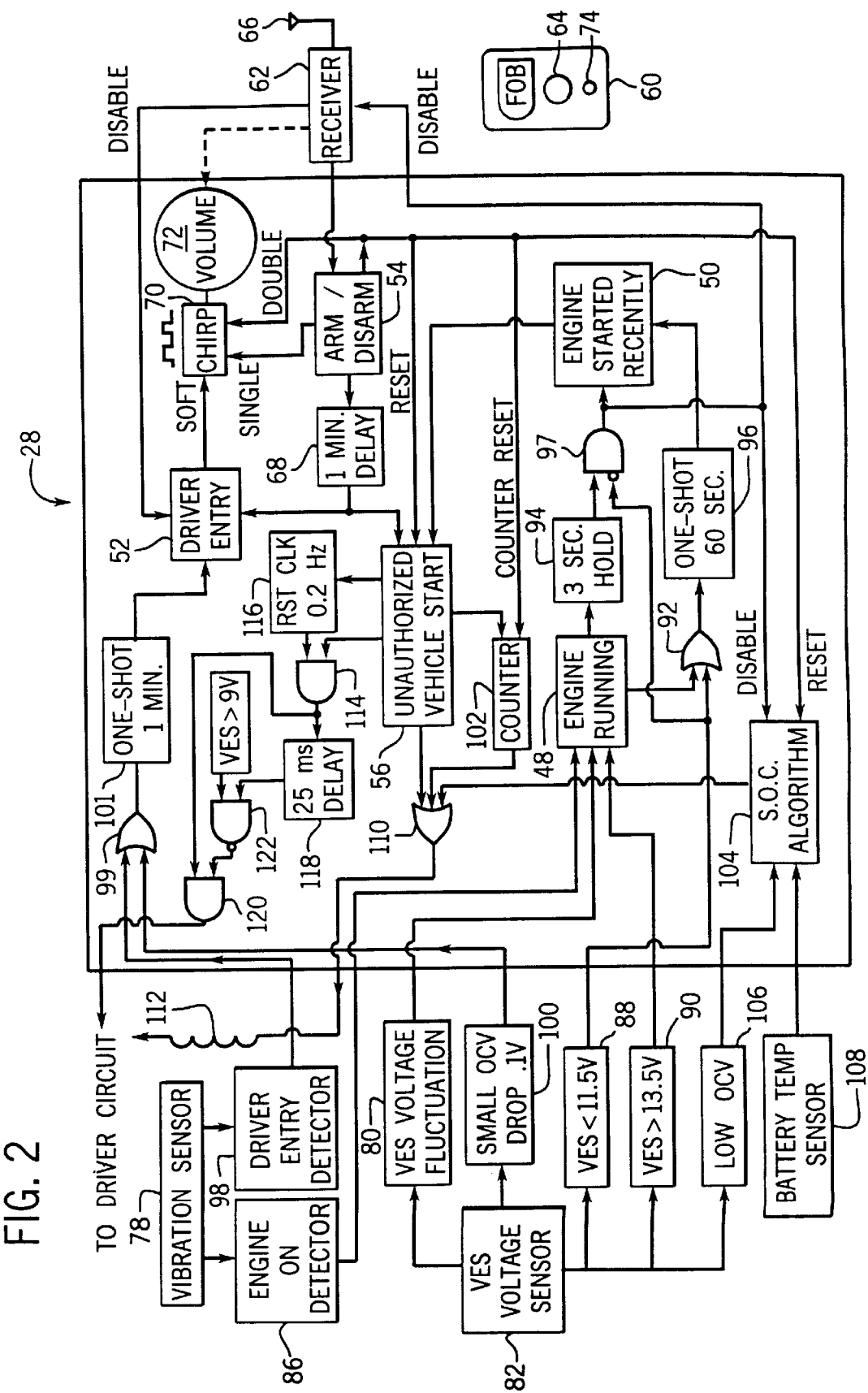
FIG. 2 is a schematic block diagram of a control portion of the anti-theft system shown in FIG. 1.

The vehicle electrical system 10 also includes an anti-theft system 26, according to an embodiment of the present invention, that disables the vehicle engine after it has been started, if an unauthorized vehicle start is detected, as will be discussed in detail below. FIG. 2 shows a schematic block diagram of a control portion 28 of the system 26 that determines whether the anti-theft system 26 is armed or disarmed, and appropriately disables the engine when an unauthorized vehicle start-up occurs. In one embodiment, the anti-theft system 26, including the control portion 28, is part of a module that is connected to the battery 12 so that it is flush with a side wall of the battery 12, or is positioned within the battery 12 according to the invention. However, the module can be in any suitable location proximate to the battery 12.

The anti-theft system 26 includes a switch 32, for example a normally closed relay switch, electrically connected in series with the battery 12 that is used to disconnect battery power applied to the electrical system 10 when the system 26 disables the engine. The switch 32 can be a mechanical switch or a solid state switch in accordance with the invention. A diode 34 is electrically connected in parallel with the switch 32, and protects the vehicle accessories 18 against any excessive surge voltage from the alternator 16 upon its disconnection from the battery 12. A dissipation resistor 36, a positive temperature coefficient (PTC) device 38 and a solid state transistor switch 40, such as a MOSFET switch, are electrically connected in series with each other, and are individually electrically connected in parallel with the battery 12 and the switch 32, as shown. Alternately, the switch 40 can be combined with the switch 32 to form a single switch having multiple switch components. The switch 40 can also be a separate relay switch. The PTC device 38 is optional as it is not required for the anti-theft system 26 to work. A driver circuit 42 has an output connected to the gate terminal of the switch 40, and causes the switch 40 to turn on so as to electrically connect the resistor 36, the PTC device 38 and the switch 40 to the positive and negative battery terminals.

In operation, the vehicle is started by the starter circuit 14 when the ignition switch is closed by powering the starter motor to rotate the flywheel. When the vehicle engine starts, the alternator 16 is energized to keep the engine running and the flywheel rotating. The control portion 28 senses that the engine is running. If the anti-theft system 26 is armed, the system 26 assumes that the engine start-up is unauthorized, and possibly a vehicle theft is occurring, so the control portion 28 causes the switch 32 to open to disconnect the battery 12 from the electrical system 10. Additionally, the control portion 28 causes the driver circuit 42 to close the switch 40 to electrically connect the resistor 36 to ground through the negative battery terminal 22 in a manner that prevents engine operation, even after being jump started by a second battery, as will be discussed below. When the resistor 36 is connected to ground and the switch 32 is open, the VES voltage is pulled to ground and dissipates through the resistor 36 so as to prevent power from being applied to the system 10, thus stalling the vehicle engine. The optional PTC device 38 acts as a circuit breaker in the event that the switch 40 fails. If the PTC device 38 heats up to a certain temperature as a result of high current from the alternator 16, the PTC device 38 will create an open circuit. In one embodiment, the control portion 28 determines whether to open the switch 32 and close the switch 40 to disable the engine after about one second.

The control portion 28 is microprocessor controlled by a microprocessor 46. The operation of the microprocessor 46 for the anti-theft system 26 is depicted by a series of status boxes and logic gates, as shown. However, as will be appreciated by those skilled in the art, the various operations of the microprocessor 46 described herein can be performed in microcode or by discreet components where applicable. Any suitable combination of microprocessor hardware, software and discreet components configured on an integrated circuit board for the purposes of the present invention can be used. The microprocessor 46 determines a number of status conditions represented by different boxes in the microprocessor 46 to control the operation of the system 26. The various status conditions are defined by an engine running status box 48, an engine started recently status box 50, a driver entry status box 52, an arm/disarm status box 54, and an unauthorized vehicle start status box 56. The discussion below of the specific operation of the anti-theft system 26 of the invention will include reference to certain delay times, signal hold times, VES voltages, clock frequencies, etc. However, as will be appreciated by those skilled in the art, these values are merely examples of practical values for performing the operation of the invention for the current technology, and are in no way intended to limit the operation of the anti-theft system 26 according to the invention.

According to a current embodiment of the anti-theft system 26, a fob transmitter 60 is used to transmit a coded frequency signal to be received by a receiver 62 to arm or disarm the system 26. Upon activation of a push button switch 64, the transmitter 60 generates and transmits a unique coded RF signal that is received by an antenna 66 and deciphered by the receiver 62 to determine if it is a valid signal. Fob transmitters of the type of the transmitter 60 are well known in the art, and are typically used in remote RF keyless entry systems for activating certain vehicle functions, such as locking and unlocking a vehicle door, or unlocking a vehicle trunk, from a remote location. For the system 26 being described herein, the transmitter 60 is a separate transmitter than the transmitter used with a remote RF keyless entry system. Therefore, the vehicle operator is required to transmit a separate signal to arm and disarm the system 26 than the signal that may be used to unlock or lock the vehicle doors. However, it is well within the scope of the present invention to use the transmitted RF signal from the keyless entry system associated with the vehicle to arm or disarm the system 26. For example, the receiver 62 may include the capability to learn the coded frequency of the vehicle's remote keyless entry system so that the receiver 62 responded to the RF signal from the keyless entry system transmitter. Receivers with such learning capabilities are known in the art. Because the fob transmitter 60 is of the type well known in the art, its operation and components need not be described herein.

When the receiver 62 receives a valid coded signal from the transmitter 60, it outputs a signal to the arm/disarm status box 54 to either arm or disarm the system 26. If the system 26 is currently armed, the control portion 28 will cause the system 26 to become disarmed, allowing the vehicle engine to be freely started. However, if the system 26 is currently disarmed, receipt of the valid coded signal will cause the control portion 28 to arm the system, and prevent the engine from remaining running if a vehicle start-up is detected.

If the signal causes the system 26 to become armed, the arm/disarm status box 54 will send a signal to the unauthorized vehicle start status box 56 which is delayed by one minute as set by a delay system 68. Additionally, the arm/disarm status box 54 will send a signal to a chirp transducer 70 to cause it to emit a single chirp so as to provide an audible signal to notify the vehicle operator that the system 26 is in the armed state. The one minute delay provided before the system 26 is actually armed is desirable because this gives the vehicle operator time to leave the vehicle before the system is armed so that operator movement within the vehicle will not disrupt the system 26. Also, the single chirp signal can be sounded after the one minute delay period so the operator is not exposed to the chirp while in the vehicle, reducing the annoyance.

If the signal causes the system 26 to become disarmed, the arm/disarm status box 54 will immediately send a disable signal to the unauthorized vehicle start status box 56. Additionally, the arm/disarm status box 54 will send a signal to the chirp transducer 70 to cause it to emit a double chirp so as to provide an audible signal showing that the system 26 is in the disarmed state to notify the vehicle operator. A volume control switch 72 is provided to increase, decrease or eliminate the chirp, depending on operator preference, and can be activated through the receiver 62 by activating a button 74 on the transmitter 60 that sends out a second coded signal. Other techniques can be used to control the volume of the chirp, such as by holding the push button switch 64 continuously for a period of time.

In order for the control portion 28 to issue the commands that will disable the vehicle engine when the system 26 is armed, it is necessary for the control portion 28 to know if the engine is running and whether it has been recently started. In accordance with the invention, the control portion 28 uses different combinations of four detections to determine whether the engine is running and has been recently started. This is by way of example in that any number of detections greater or less than four, or other types of detections to determine whether the engine is running, can be used depending on the level of redundancy and reliability desired. The detections according to the invention include a vibration detection sensed by a vibration sensor 78, VES voltage fluctuations sensed by a VES voltage fluctuation sensor 80, and separate VES voltages sensed by a VES voltage sensor 82. VES voltage fluctuations are evidence of the vehicle engine being started because of the various drains on the battery 12 at vehicle start-up. If the VES voltage is greater than approximately 13.5 volts, it is an indication that the engine is running because the alternator 16 will be charging the battery 12. Vehicle vibrations are an indication that the engine has started because of the vibrations to the vehicle caused by the engine. If the VES voltage falls below 11.5 volts, it is an indication that the engine has been recently started because of the significant current drain on the battery 12 when the vehicle engine is started.

The vibration sensor 78 sends an output signal to an engine-on detector 86 when it senses a vibration. The engine-on detector 86 then sends an output signal to the engine running status box 48. The VES voltage sensor 82 outputs a VES voltage signal indicative of the VES voltage to a voltage detector 88, a voltage detector 90 and the VES voltage fluctuation sensor 80. The VES voltage fluctuation sensor 80 sends an output signal to the engine running status box 48 when it detects significant fluctuations in the VES voltage. The voltage detector 90 sends an output signal to the engine running status box 48 if the VES voltage is greater than 13.5 volts. The voltage detector 88 sends an output signal to an input of an OR gate 92 if the VES voltage is less than 11.5 volts. If the engine running status box 48 receives all of the engine running signals from the engine-on detector 86, the VES voltage fluctuation sensor 80 and the VES detector 90, it also sends an output signal to an input of the OR gate 92. There is a significant level of redundancy in the determination of whether the engine has been started and is running to increase the system accuracy and reliability in the event that one or more of the engine running detection techniques or sensors is disabled, defective or otherwise inoperative.

When the engine running status box 48 receives two of the three engine running signals, it provides an engine running output signal to a three second hold system 94. The hold system 94 holds the engine running output signal for three seconds beyond the time the engine running status box 48 receives the two out of three signals to provide system integrity in the event that one of the input signals to the engine running status box 48 fluctuates or stops. The OR gate 92 sends an output signal to a sixty second one-shot system 96 if it receives all three of the engine running signals or receives the signal from the detector 88. The sixty second one-shot system 96 holds the output from the OR gate 92 high for sixty seconds after it is received. The output signal from the hold system 94 and an inverted signal from the voltage detector 88 are applied as inputs to an AND gate 97. If two of the three engine running signals are high and the VES voltage is greater than 11.5 volts, the output of the AND gate 97 will go high. The AND gate 97 is provided to allow the engine to be started before the control portion 28 issues an unauthorized vehicle start command. When the battery 12 rotates the flywheel during cranking the VES voltage falls below 11.5 volts. When the engine starts, the VES voltage then goes above 11.5 volts, allowing the AND gate 97 to go high. This also prevents the output of switch 32 from opening during the high current at start-up.

Both the output signal from the AND gate 97 and the output signal from the one-shot system 96 are applied to the engine started recently status box 50. The engine started recently status box 50 sends an output signal to the unauthorized vehicle start status box 56 that the engine is running and has been recently started when it receives both the output signals from the hold system 94 and the one-shot system 96. If the system 26 is armed, the unauthorized vehicle start status 56 will issue the appropriate signals to disable the engine, as will be further discussed below. The high output signal from the AND gate 97 is also sent as a disable signal to disable the receiver 62 and prevent it from acting on any received transmission signals from the transmitter 60 that could disrupt the operation of the system 26 when the engine is running.

The anti-theft system 26 of the invention also provides capabilities to determine when a vehicle occupant or driver has entered the vehicle. This is important to allow the authorized vehicle operator to know that the anti-theft system 26 is armed prior to the operator turning the ignition key to start the vehicle. To provide this driver entry detection, the vibration sensor 78 also sends the vibration signal to a driver entry detector 98. The driver entry detector 98 then sends an output signal to an OR gate 99. Additionally, the VES voltage sensor 82 sends the VES voltage signal to a voltage detector 100 that determines small open circuit voltage (OCV) changes of the VES voltage on the order 0.1 volts. A small drop in the VES voltage is indicative of an interior light turning on or other electrical system turning on as would occur when someone enters the vehicle. The detector 100 also sends an output signal to the OR gate 99. If the OR gate 99 receives either of these two input signals, it sends an output signal to a one minute one-shot system 101 that holds the output of the OR gate 99 high for one minute. This high output signal is applied to the driver entry status box 52 which then sends a signal to the chirp transducer 70 while the signal is high to sound a soft chirp at short intervals to give an audible indication to the vehicle operator that the system 26 is armed. Therefore, the vehicle driver will receive a one minute warning that the system is armed so that he can disarm the system 26 prior to starting the vehicle. When the system 26 is disarmed, a disable signal from the receiver 62 is applied to the driver entry status box 52 to prevent the soft chirp. When the system 26 is armed, the delay system 68 sends an output signal to the driver entry status box 52 that the system 26 is armed.

A counter 102 is provided to give a count of the number of times an unauthorized vehicle start has been attempted. Each time the unauthorized vehicle start status box 56 receives an output signal from the engine started recently status box 50 when the system 26 is armed, it sends an output signal to the counter 102 that increases the count value. Each time the system 26 is disarmed, the arm/disarm status box 54 sends a counter reset signal to the counter 102 that resets the counter 102 to zero or some reference value. In one embodiment, the maximum count value is five counts, after which the counter 102 must be reset before the vehicle engine can be started.

The anti-theft system 26 also includes capabilities to prevent further state of charge (SOC) decline of the battery 12 once the battery state of charge falls below a predetermined level. The predetermined level is determined as a state of charge where a further decrease of the battery state of charge may not provide enough power to start the vehicle engine. An (SOC) algorithm box 104 is provided that includes an algorithm to determine when the battery SOC has reached this level. Algorithms of this type are known in the art. For example, see U.S. Pat. No. 5,416,402 issued to Reher et al. The VES voltage sensor 82 also outputs the VES voltage signal to a low OCV detector 106. When the open circuit voltage of the battery 12 falls below a predetermined value, the detector 106 sends an output signal to the SOC algorithm box 104. Additionally, a battery temperature sensor 108 sends an output signal indicative of the temperature of the battery 12 to the algorithm box 104. This enables the SOC algorithm to adjust the predetermined voltage level dependent on the battery temperature. The SOC algorithm is reset when the receiver 62 receives a valid coded signal that disarms the system 26 to allow the vehicle to be started so that if the SOC algorithm has issued a command of low battery state of charge, the engine can be started. Additionally, the SOC algorithm is disabled by a signal from the hold system 94 when the engine is running.

An OR gate 110 is provided that receives three inputs, one from the unauthorized vehicle start status box 56, one from the counter 102, and one from the SOC algorithm box 104. If any of these three inputs goes high, the OR gate 110 sends an output signal to a coil 112 to open the switch 32 and disconnect the battery 12, as discussed above. Therefore, if the unauthorized vehicle start box 56 receives a signal that the engine has been recently started from the status box 50 when the system 26 is armed, it will issue the output signal that opens the switch 32. Likewise, if the counter 102 reaches the maximum count value, indicating consecutive unauthorized attempts to start the vehicle, the OR gate 110 will also open the switch 32. And, if the VES voltage dissipates to a certain safe level, the output signal from the SOC algorithm box 104 will open the switch 32. As long as the OR gate 110 is receiving a high input signal, the switch 32 will be open.

The system 26 also includes capabilities to detect the presence of a second battery, such as would be used during a jump start in an attempt to thwart the anti-theft system 26. The control portion 28 incorporates this feature into the process of closing the switch 40 to drain the alternator voltage. When the system 26 is armed and the unauthorized vehicle start status box 56 receives the signal from the engine started recently status box 50, the unauthorized vehicle start status box 56 sends an output signal to an input of an AND gate 114 and a reset clock circuit 116. The reset clock circuit 116 includes a reset clock that is reset to zero by the signal from the unauthorized vehicle start status box 50. The clock signal from the reset clock is applied to another input of the AND gate 114. In this embodiment, the reset clock is a 0.2 Hz clock having pulse widths of about one second such that when the clock is reset by the signal from the status box 56, the clock output initially remains low for one second. The reset clock can provide other time intervals, such as one second high and two seconds low. Thus, the output of the AND gate 114 also remains low during this time period, i.e., the first one-half time period of the clock.

The input to the engine started recently status box 50 from the hold system 94 will be high for at least three seconds, and the input to the engine started recently status box 50 from the OR gate 92 will be high for at least sixty seconds. When the clock pulse goes high one second after being reset, the output of the AND gate 114 also goes high. This gives the one second lag time from the time when the engine is started until the time the system 26 causes it to stall. Thus, the high currents associated with vehicle start-up are not applied to the resistor 36 and the switch 40. To test whether a second battery has connected, the output of the AND gate 114 is applied to a 25 ms delay circuit 118 and an input to a second AND gate 120. The 25 ms delay gives the switch 40 time to close and the alternator 16 time to dissipate through the resistor 36. An output signal from the delay circuit 118 is applied to an input of a NAND gate 122 and a determination of whether the positive VES voltage of the battery 12 is greater than 9 volts is applied to another input of the NAND gate 122. This input to the NAND gate 122 also gives a determination of whether the alternator voltage has dropped below 9 volts. If the positive VES voltage is greater than 9 volts, the input to the NAND gate 122 is high. The output of the NAND gate 122 is applied to another input of the second AND gate 120. Therefore, when the output of the AND gate 114 initially goes high, prior to the lapse of the 25 ms delay, the output of the NAND gate 122 is high because at least one of the inputs to the gate 122 is low. In this logic situation, the output of the NAND gate 122 is high causing the output of the AND gate 120 to be high. When the output of the AND gate 120 is high, the driver circuit 42 closes the switch 40 to connect the resistor 36 to ground.

After the 25 ms delay has passed, the input from the AND gate 114 to the NAND gate 122 is high because the reset clock pulse is still high. Because the switch 32 has been open for more than a second and the switch 40 that drains the alternator 16 has been closed 25 ms, the positive VES voltage should be less than 9 volts by this time. If the VES voltage is less than 9 volts when the 25 ms delay has elapsed, then the output of the NAND gate 122 would remain high for the duration of the clock cycle when the reset clock is high because at least one input to the NAND gate 122 is still low. On the next low clock pulse of the reset clock, the output of the AND gate 114 goes low, causing the second AND gate 120 to go low, thus opening the switch 40. However, by this time the engine has been stalled. The system is now ready for the next unauthorized vehicle start-up.

If a second battery has been connected to the battery 12, the positive VES voltage at the post 20 should be greater than 9 volts. This will cause the output of the NAND gate 122 to go low during the positive cycle of the clock after the 25 ms delay, which is turn causes the output of the AND gate 120 to go low, opening the switch 40. The time that the output of the second AND gate 120 is high during the 25 ms delay, if the VES voltage is greater than 9 volts, does not provide enough time to stall the engine. Thus, the engine does not stall when the second battery is connected. The NAND gate 122 causes the switch 40 to open before the engine stalls, protecting the resistor 36 from being damaged by the second battery. The engine remains running and the output signal from the unauthorized vehicle start status box 56 remains high still indicating an unauthorized vehicle start. After the one second high clock cycle has passed, the output of the AND gate 114 goes low which causes the output of the AND gate 120 to remain low. When the clock signal goes high again, the output of the AND gate 114 goes from low to high which is again delayed by the delay system 118 causing the output of the NAND gate 122 to be high. Therefore, on each high clock pulse signal, the control portion 28 tests whether a second battery has been connected to the engine, and keeps the driver circuit 42 from closing the switch 40 while the second battery is connected. When the second battery is finally removed, the engine will then stall on the next positive clock pulse.

Figure 3:
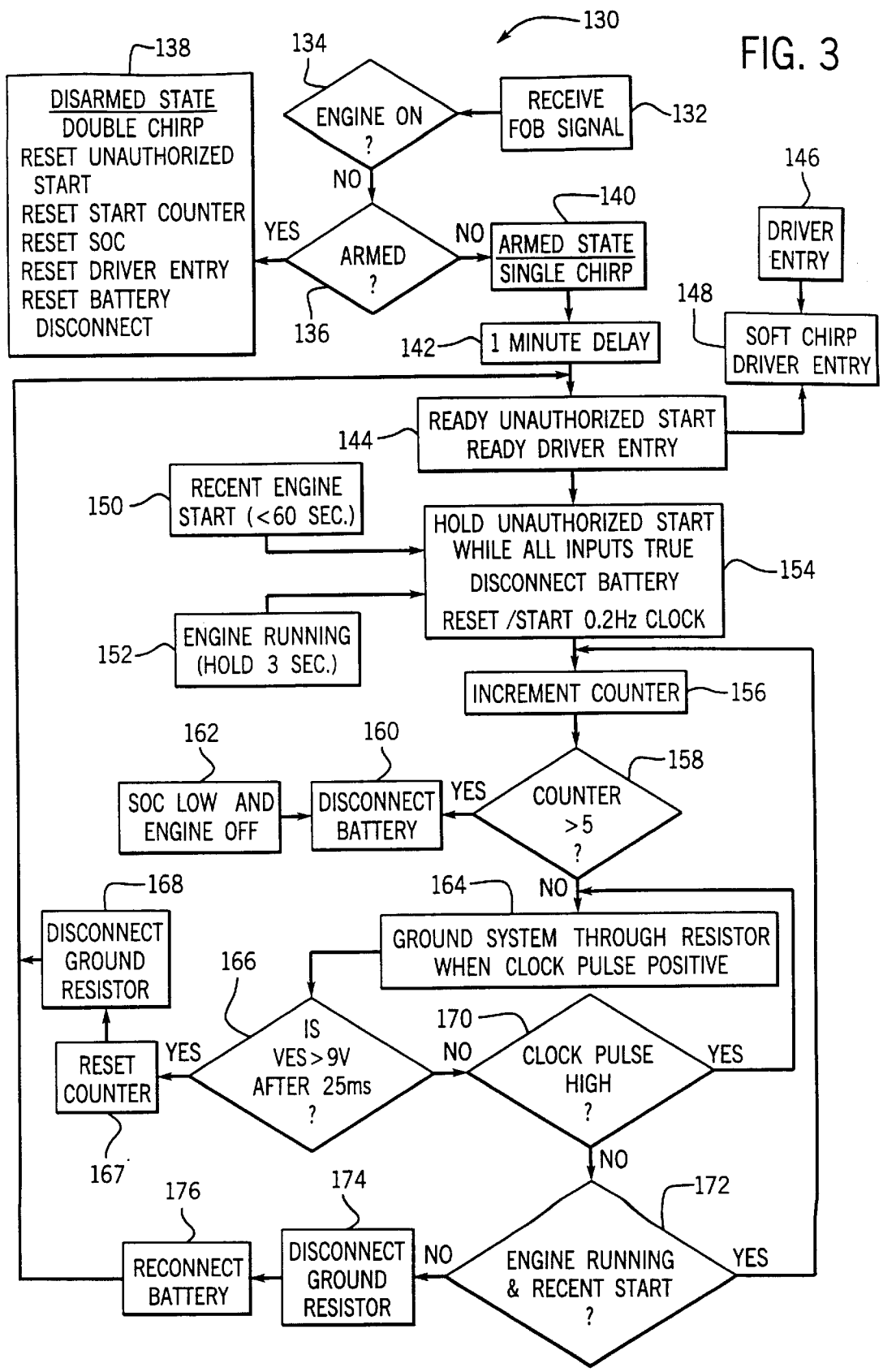
FIG. 3 is a flow chart diagram showing the operation of the anti-theft system depicted in FIGS. 1 and 2, according to one embodiment of the present invention.

FIG. 3 shows a flow chart diagram 130 that further describes the operation of the the anti-theft system 26 discussed above. When the control portion 28 receives the transmitter signal from the fob transmitter 60 at step 132, it determines whether the vehicle engine is on at decision diamond 134. If the engine is running, the receiver 62 should be disabled so the system 26 doesn't do anything. If the vehicle engine is not running, the control portion 28 then determines whether the system 26 is armed at decision diamond 136. If the system 26 is currently armed, the control portion 28 will disarm the system 26, cause the transducer 70 to emit a double chirp, reset the unauthorized vehicle start box 56, reset the counter 102, reset the SOC algorithm 104, reset the driver entry status box 52, and reset the battery disconnect as shown at step 138 and discussed above. In this condition, the vehicle engine can be freely started. If the system 26 is currently disarmed, the control portion 28 will arm the system 26 and cause the transducer 70 to emit a single chirp as shown at step 140. The armed state is not actually activated until a predetermined delay period has passed, such as one minute, as indicated by step 142.

The system 26 is actually armed when the unauthorized vehicle start box 56 and the driver entry box 52 are activated and ready as shown at step 144. In this condition, the control portion 28 is set to monitor the various conditions, as discussed above, when the system 26 is armed. If the system 26 senses that the vehicle has been entered, as indicated by step 146, while the system 26 is armed, the driver entry status box 52 will cause the transducer 70 to emit the soft chirp to notify the driver that the system 26 is armed, as indicated at step 148.

When in the armed state, the control portion 28 may detect a recent engine start, as indicated at step 150, and the engine is running, as indicated at step 152, as applied to the engine started recently status box 50 and discussed above. The unauthorized vehicle start status box 56 will then proceed to disable the engine, as indicated by step 154. In this condition, the unauthorized vehicle start status box 56 will hold the unauthorized start while the recent engine start signal and the engine running signal are high, will disconnect the battery through the OR gate 110 and the switch 32, and reset the reset clock to zero. The control portion 28 will also increment the counter 102, as indicated by step 156, and then determine if the counter 102 has reached a predetermined number, here five counts, as indicated by decision diamond 158. As discussed above, when the system 26 is disarmed at step 138, the counter 102 is reset. If the counter 102 has reached a value greater than five, the control portion 28 proceeds to disconnect the battery 12 through the OR gate 110, as indicated at step 160. Additionally, if the battery open circuit voltage falls below the predetermined value, as determined by the SOC algorithm status box 104 when the system 26 is armed, the control portion 28 will also disconnect the battery 12 through the OR gate 110 as indicated at step 162. When the battery 12 is disconnected in this manner by the switch 32, the control portion 28 does not close the switch 40 to connect the resistor 36 to ground.

If the counter 102 has not reached the maximum count number, the control portion 28 proceeds to ground the VES voltage through the resistor 36 when the reset clock pulse goes high as indicated by step 164 and discussed above. Then, the control portion 28 determines if the VES voltage is greater than 9 volts after the 25 ms delay by the delay circuit 118 as applied to the input of the NAND gate 122, as indicated by decision diamond 166. If the VES voltage is greater than 9 volts after the delay, then the control portion 28 resets the counter 102 at step 167, and disconnects the resistor 36 from ground (opens switch 40), through the AND gate 120, as indicated by step 168, and then returns to the step 144 to indicate that the system 26 is ready to determine an unauthorized vehicle start. The step of decision diamond 166 is there to determine if the potential thief has connected a second battery to the vehicle, i.e., is trying to jump start the vehicle. If this is the case, the VES voltage will not go below 9 volts, and thus the resistor 36 will not be connected to ground. If the VES voltage is below 9 volts, then decision diamond 170 determines if the clock pulse of the reset clock is high. If the clock pulse is high, then the control portion 28 returns to the step of grounding the VES voltage through the resistor 36 at step 164. If the clock pulse is low, then the control portion 28 determines if the engine is running and whether it is a recent engine start at decision diamond 172. If the engine is running and has been recently started, then the system increments the counter at step 146 and proceeds through the steps of disabling the engine as discussed above. If the engine is not running, then the control portion 28 disconnects the resistor 36 from ground at step 174 and reconnects the battery 12 by deenergizing the relay 32 at step 176. This indicates that the engine stall was successful, and now the system 26 is ready to be disabled again if the potential thief attempts to restart the engine.

Figure 4:
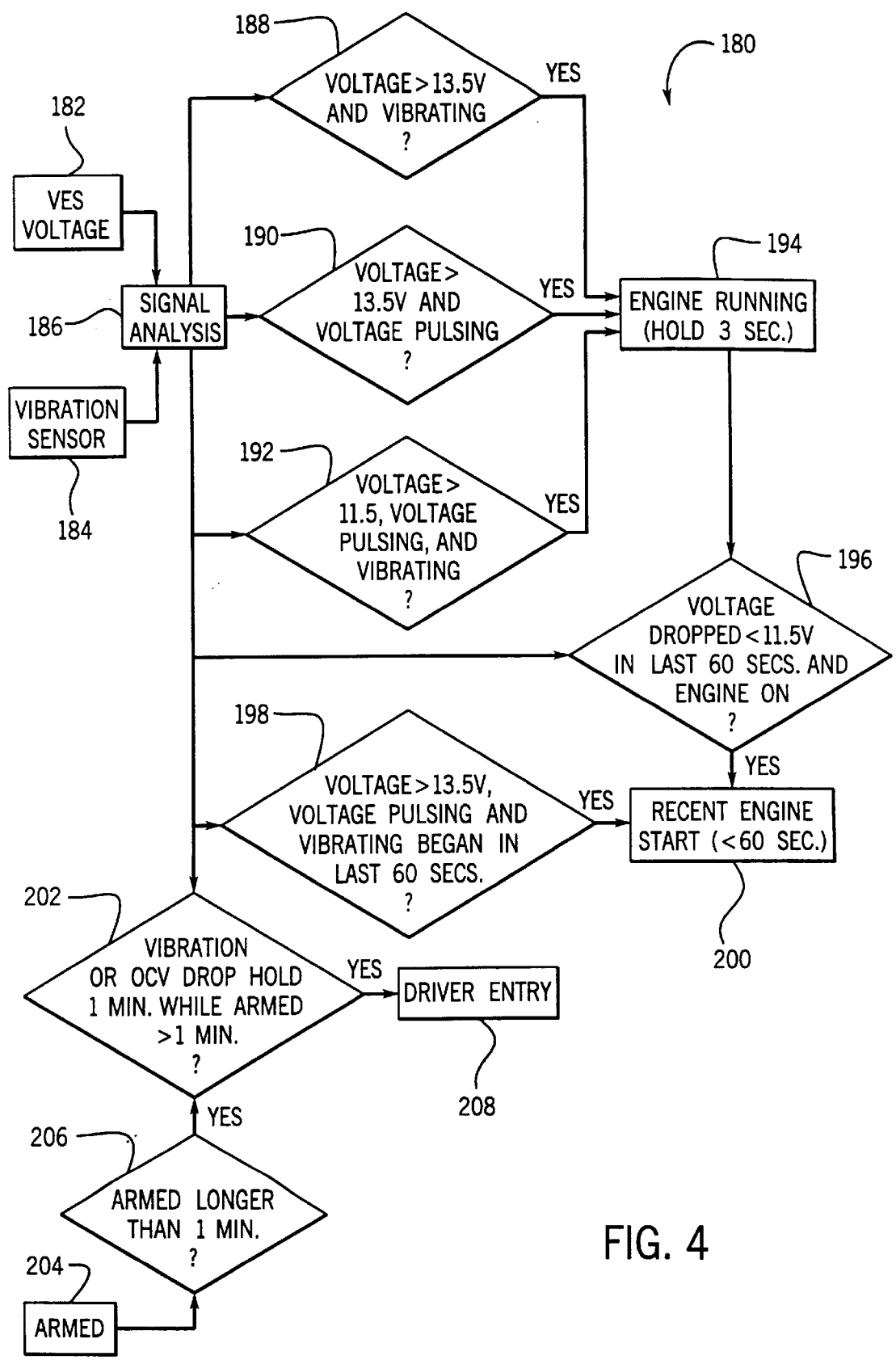
FIG. 4 is a second flow chart diagram showing a portion of the operation of the anti-theft system of the invention that determines the engine running status.

FIG. 4 is a flow chart diagram 180 showing the logic and operation used to determine if the engine is running at the engine running status box 48, and whether the engine has been recently started at the engine recently started status box 50. The VES voltage signal from the VES voltage monitor 82, provided at step 182, and the output signal from the vibration sensor 58, provided at step 184, are applied to a signal analysis step 186 to determine the VES voltage, VES voltage fluctuations, and the vibration status. An output of the signal analysis step 186 giving the VES voltage and vehicle vibration status is applied to a decision diamond 188 that determines if the VES voltage is above 13.5 volts and whether the vehicle is vibrating. The output from the single signal analysis step 186 is also applied to a decision diamond 190 that determines if the VES voltage is greater than 13.5 volts and whether the VES voltage is fluctuating. Additionally, the output of the signal analysis step 186 is applied to a decision diamond 192 to determine if the VES voltage is greater than 11.5 volts, whether the VES voltage is fluctuating and whether the vehicle is vibrating. The yes outputs from the decision diamonds 188, 190 or 192 are applied to an engine running box 194, which is held for at least three seconds. The outputs from the signal analysis step 186 and the engine running box 194 are applied to a decision diamond 196 that determines if the VES voltage has dropped below 11.5 volts in the last sixty seconds and whether the engine is on. This represents the function of the OR gate 92. The output of the signal analysis step 186 is also applied to a decision diamond 198 that determines if the battery voltage is greater than 13.5 volts, the VES voltage is fluctuating, and a vibration is occurring. The outputs from the decision diamonds 196 and 198 are applied to a recent engine start box 200 giving a signal that the engine has been recently started and performs the function of the engine started recently status box 50.

The output of the signal analysis box 186 is also applied to a decision diamond 202 that determines driver entry. If the system 26 is armed at box 204 and has been armed longer than one minute at decision diamond 206, and a vehicle vibration has occurred or an open circuit voltage drop has occurred, the system 26 indicates a driver entry at box 208.

Figure 5:
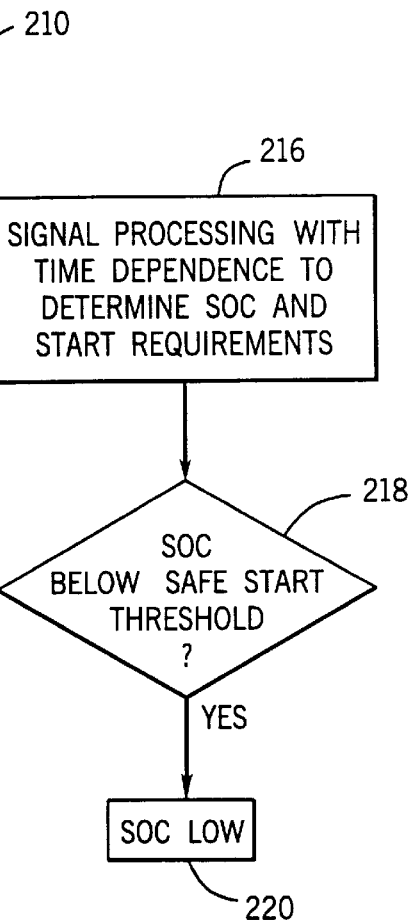
FIG. 5 is a third flow chart diagram showing another portion of the operation of the anti-theft system of the invention that monitors a safe battery state of charge level.

FIG. 5 is a block diagram 210 showing the operation of the state of charge algorithm at box 104. The VES voltage at box 212 and the battery temperature at box 214 are applied to a signal processing box 216 that determines the state of charge and start requirements. These signals are applied to a decision diamond 218 that determines whether the state of charge voltage has fallen below a safe threshold. If the state of charge voltage has fallen below the safe threshold then a state of charge low signal is emitted at box 220 that opens the relay 32.

Figure 6:
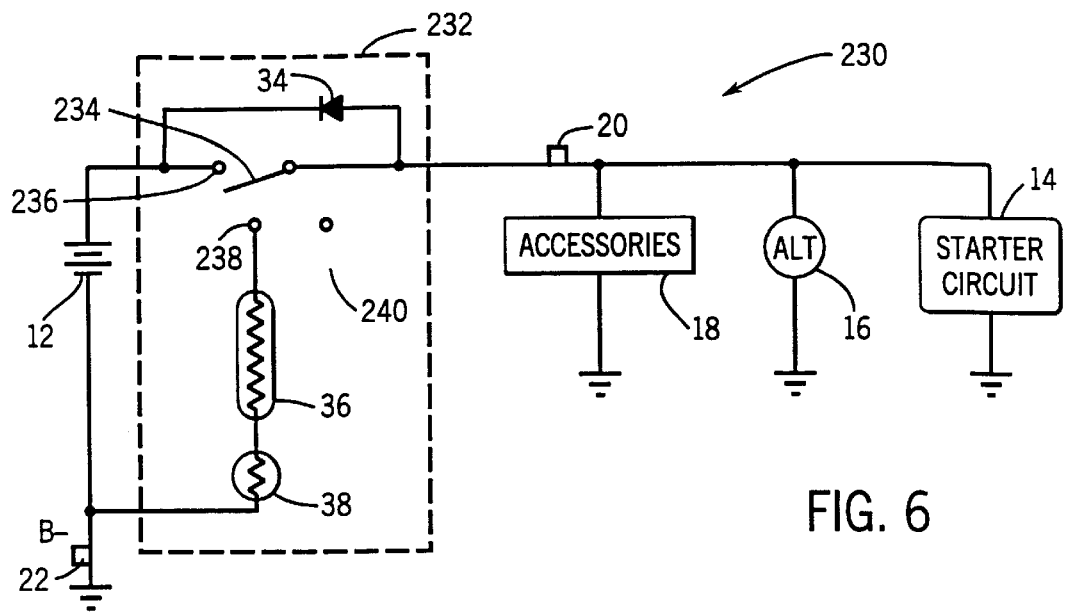
FIG. 6 is a schematic block diagram of a vehicle anti-theft system that disables the vehicle engine after it has been started that incorporates a multi-contact electro-mechanical switch, according to another embodiment of the present invention.

FIG. 6 is a schematic block diagram of a vehicle electrical system 230 that is similar to the electrical system 10 discussed above, and includes an anti-theft system 232 according to another embodiment of the present invention. Those components or elements of the electrical system 230 that are identical to the electrical system 10 are labeled with the same reference numeral. In this embodiment, the anti-theft system 26 has been replaced with the anti-theft system 232 where the difference is that the switch 32 and the switch 40 have been combined into a single electro-mechanically actuated switch 234. The driver circuit 42 has also been eliminated. The electro-mechanically actuated switch 234 can be any suitable electro-mechanically actuated switch known in the art, such as a relay, solenoid, etc. that operates as described below. The electro-mechanical switch 234 includes a coil 235 (see FIG. 7), that when energized causes the switch 234 to be actuated in the manner as discussed below. As with the system 26, discussion of a system 232 below will include reference to certain delay times, signal hold times, VES voltages, clock frequencies, etc. These specific values are being cited by way of nonlimiting examples for a practical use. However, these values could vary from system to system within the scope of the present invention.

The switch 234 includes a battery switch contact 236, a VES switch contact 238, and a disconnect contact 240. When the switch 234 is connected to the battery contact 236, the battery 12 is connected in circuit and provides power to run the various electrical elements of the circuit 230. When the switch 234 is electrically connected to the VES contact 238, the battery 12 is disconnected and the resistor 36 is electrically connected to ground and is available to drain the VES voltage to stall the vehicle engine, as discussed above. When the switch 234 is connected to the disconnect contact 240, both the battery 12 and the resistor 36 are disconnected from the circuit 230. The operation of the switch 23 is such that when the coil 235 is not energized, the switch 234 will either be connected to the battery contact 236 or the disconnect contact 240. Each time the coil 235 is energized, the switch 234 will be actuated to contact the VES contact 238 while the coil 235 is energized, and then will move to the battery contact 236 or the disconnect contact 240 when the coil 235 is deenergized. In other words, if the switch 234 is connected to the battery contact 236 and the coil 235 is then energized, the switch 234 will contact the VES contact 238 while the coil 235 is energized, and will then move to the disconnect contact 240 when the coil 235 is deenergized. Likewise, if the switch 234 is connected to the disconnect contact 240 and the coil 235 is energized, the switch 234 will contact the VES contact 238 while the coil 235 is energized, and will then move to the battery contact 236 when the coil 235 is deenergized. This type of switch coupled with the logic system discussed below allows the anti-theft system 232 to operate in substantially the same manner as described above, and incorporate a single switch that combines the operations of the switch 32 and a switch 40.

Figure 7:
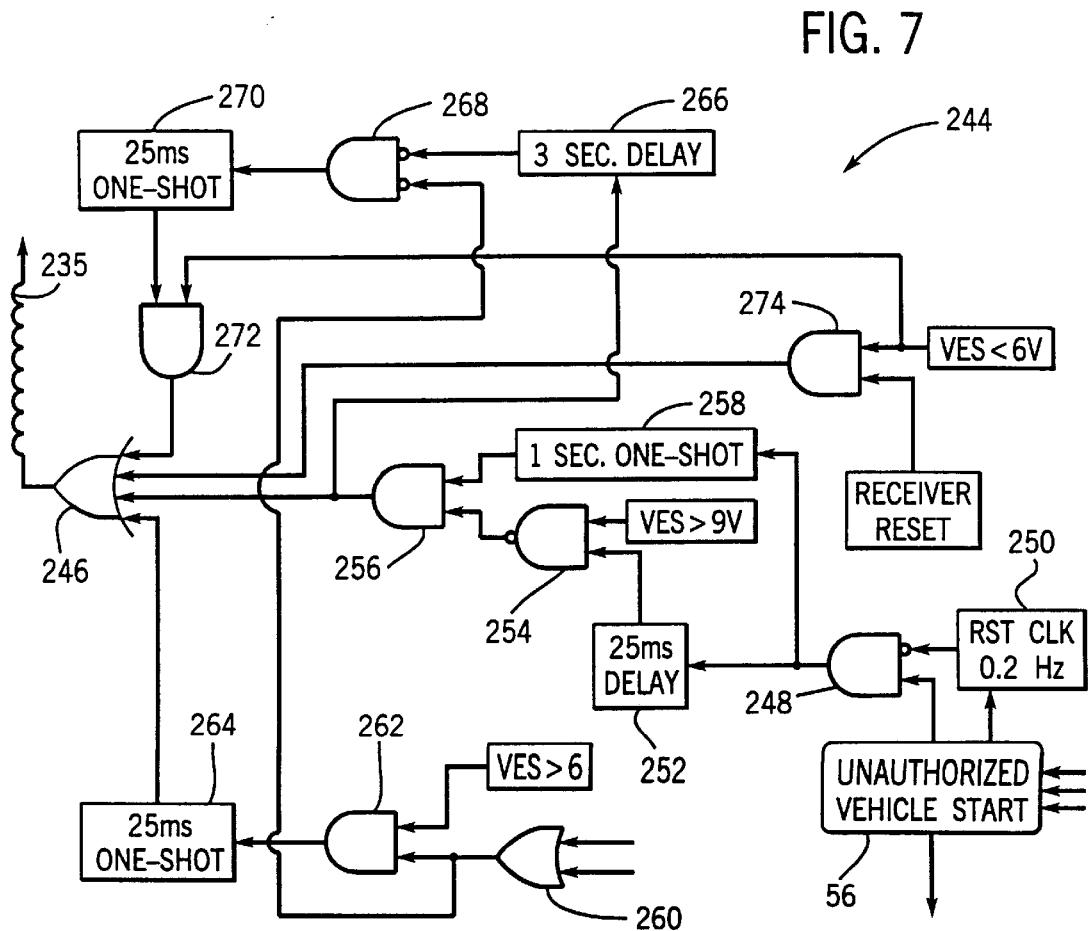
FIG. 7 is a schematic block diagram of a control portion of the anti-theft system shown in FIG. 6.

FIG. 7 shows a schematic block diagram of a control portion 244 used to control the anti-theft system 232. The control portion 244 is similar to the control portion 28 discussed above, and includes all of the same elements found in the control portion 28. In order to simplify the discussion of the control portion 244, only those elements not found in the control portion 28 are shown in this figure. It will be understood that the operation of those elements not shown in this figure, but actually included in the portion 244, are the same as those elements discussed above with reference to FIG. 2.

The control portion 244 includes an OR gate 246 having four inputs. The OR gate 246 replaces the OR gate 110 above. When any of the inputs is high, the OR gate 246 provides an output to the coil 235 associated with the switch 234 that causes it to switch from the battery contact 236 to the disconnect contact 240, or from the disconnect contact 240 to the battery contact 236, depending on its current position, as discussed above. For the time that the input to the OR gate 246 remains high, the switch 234 will be connected to the VES contact 238.

The part of the logic operation that causes the switch 234 to switch to the VES contact 238 to ground the VES voltage to stall the engine is significantly the same as the logic operation discussed above with reference to the control portion 28. The control portion 244 includes an AND gate 248, a reset clock circuit 250, a delay system 252, a NAND gate 254, and an AND gate 256 connected together in the same manner as the AND gate 114, the reset clock circuit 116, the delay system 118, the NAND gate 122 and the AND gate 120. However, this part of the control portion 244 includes a one-second one-shot system 258 that holds the output of the AND gate 248 applied to the AND gate 256 high for one second. Additionally, the input to the AND gate 248 from the reset clock circuit 250 is inverted so that the output of the AND gate 248 goes high on the low clock pulses. When the output of the AND gate 256 is high, the output of the OR gate 246 is high, causing the coil to energize the switch 234. This is in contrast to the control portion 28, where the output of the AND gate 120 was applied to the driver circuit 42 to close the switch 40. In the control portion 244, the switch 40 has been eliminated, and the output of the AND gate 256 is now used to connect the switch 234 to the VES contact 238. Because the switch 234 is connected to the VES contact 238 when the coil 235 is energized, the one-shot system 258 only allows the output of the AND gate 256 to be high for one second, thus allowing the coil 235 to only be energized for one second. This gives plenty of time for the engine to stall and protects the resistor 36. The combination of the delay system 252 and the NAND gate 254 is used to test for a second battery in the same manner as discussed above.

In the control portion 244, the outputs from the counter 102 and the SOC algorithm box 104 are applied to an OR gate 260. If either of the inputs to the OR gate 260 are high, meaning that the state of charge of the battery 12 is at a minimum safe level or the counter has reached the maximum number of unauthorized vehicle starts, the output of the OR gate 260 will be high. This high output is applied as an input to an AND gate 262. A second input of the AND gate 262 is a determination of whether the VES voltage is greater than six volts. If the VES voltage is greater than six volts, then the switch 234 is connected to the battery contact 236, and not the disconnect contact 240. This provides a test to determine whether the switch 234 is connected to the battery contact 236 or to the disconnect contact 240 before the control portion 244 switches the switch 234 in response to a high signal from the SOC algorithm box 104 or the counter 102. If the switch 234 is connected to the battery contact 236, the output of the AND gate 262 will go high, which is applied to a 25 ms one-shot system 264. The high output of the one-shot system 264 is applied as one of the inputs to the OR gate 246 and remains high for 25 ms. Thus, when the output of the AND gate 262 goes high when the maximum safe state of charge level is reached or the maximum unauthorized vehicle starts has been reached, and the switch 234 is connected to the battery contact 236, the OR gate 246 will cause the switch 234 to switch to the disconnect contact 240 after it has been connected to the VES contact 238 for the time that the output of the OR gate 246 is high. Although the switch 234 is connected to the VES contact 238 for the duration of the 25 ms set by the one-shot system 264, the duration is very short and the engine is not running, and thus has no effect on the operation of the anti-theft system 232. If the switch 234 is already connected to the disconnect contact 240, then the output of the AND gate 262 will not go high, and thus the switch 234 will not be switched.

The control portion 244 also provides logic to switch the switch 234 from the disconnect contact 240 to the battery contact 236 after an unauthorized vehicle start has been detected and the switch 234 has been switched from the contact 236 to the contact 240. When the output of the AND gate 256 goes high, this high signal is also applied to a three second delay system 266. The output of the delay system 266 is inverted and applied to an AND gate 268. Additionally, the output of the OR gate 260 is inverted and applied to another input of the AND gate 268. The three second delay provides a time limit after the vehicle engine has been stalled to give the flywheel time to slow down or stop so that the momentum of the flywheel does not cause a spontaneous reignition of the vehicle engine. In other words, if any unauthorized vehicle start has occurred, and the engine has been stalled by a signal from the AND gate 256 to the OR gate 246, the flywheel may still be rotating even though the engine has been stalled. If both the input to the three second delay system 266 and the output of the OR gate 260 are low, meaning an unauthorized vehicle start is not occurring (the engine has not been recently started and is not running), the counter has not reached the maximum number of unauthorized starts, and the SOC algorithm has not indicated that the battery 12 is at the minimum safe battery state of charge level, the output of the AND gate 268 will be high. This high output is applied to a 25 ms one-shot system 270 that holds the output from the AND gate 268 high for 25 ms. The output from the one-shot system 270 is applied as an input to an AND gate 272, and a determination of whether the VES voltage is below six volts is applied to another input of the AND gate 272. Therefore, the control portion 244 switches the switch 234 from the disconnect contact 240 to the battery contact 236 when the state of charge is above the minimum safe level, the maximum number of unauthorized vehicle starts has not occurred, an unauthorized vehicle start is not occurring and the switch 234 is connected to the disconnect contact 240. This allows the switch 234 to be reset to the battery contact 236 when the system 232 is armed and the engine is not running and has not been recently started.

The control portion 244 also causes the switch 234 to be switched from the disconnect contact 240 to the battery contact 236 when the system 232 is disarmed. When the receiver 60 receives the disarm signal, it is applied as an input to an AND gate 274. If the VES voltage is less than six volts, indicating that the switch 234 is connected to the disconnect contact 240, the output of the AND gate 274 will be high, and this high signal is applied to the OR gate 246. Therefore, the OR gate 246 will switch the switch 234 from the disconnect contact 240 to the battery contact 236 to allow the vehicle engine to be started. The output of the AND gate 274 will be high only for the duration that the receiver receives the disarm signal from the transmitter 60. Therefore, it can be seen that the control portion 244 disconnects the battery 12, causes the VES voltage to be grounded through the resistor 36, and reconnects the battery 12 for an authorized vehicle start under the same conditions as the control portion 28 discussed above.

Figure 8:
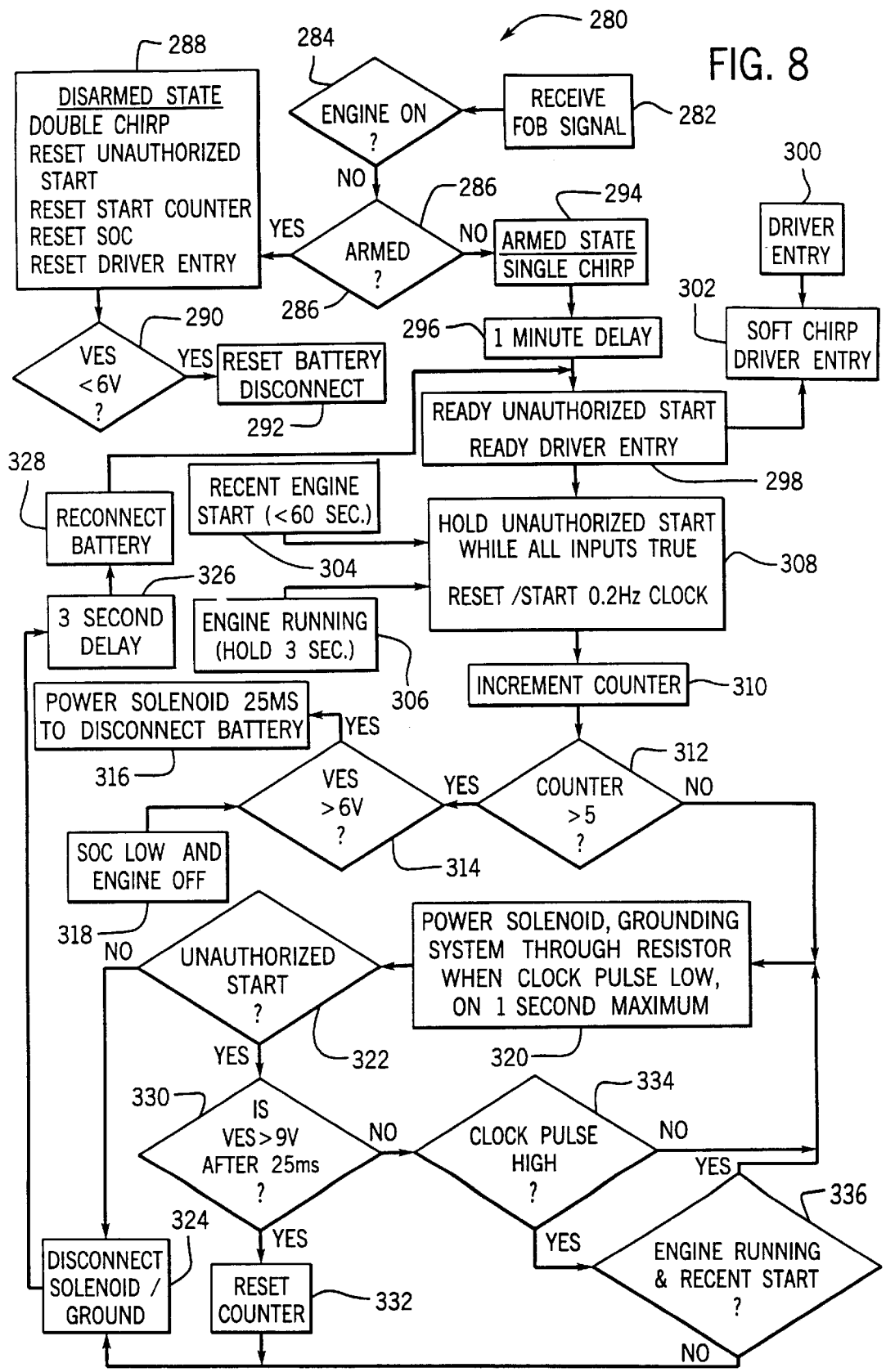
FIG. 8 is a flow chart diagram showing the operation of the anti-theft system depicted in FIGS. 6 and 7, according to another embodiment of the present invention.

FIG. 8 is a flow chart diagram 280 showing the operation of the control portion 244 discussed above. As with the control portion 28, when the control portion 244 receives the transmitter signal from the fob transmitter 60 at step 282, it determines whether the vehicle engine is on at decision diamond 284. If the engine is running, the receiver 62 should be disabled so the system 232 doesn't do anything. If the vehicle is not running, the control portion 244 then determines whether the system 232 is armed at decision diamond 286. If the system 232 is currently armed, the control portion 244 will disarm the system 232, cause the transducer 70 to emit a double chirp, reset the unauthorized vehicle start box 56, reset the counter 102, reset the SOC algorithm 104, and reset the driver entry status box 52 in the same way as the control portion 28, as shown at step 288. The control portion 244 does not reset the battery disconnect until it first tests whether the VES voltage is less than six volts, as indicated at decision diamond 290. This is because the system 232 does not want to switch the switch 234 if it is already connected to the battery contact 236. If the positive VES voltage is less than six volts, then the switch 234 is connected to the disconnect contact 240, so the system 232 will reset the battery disconnect at step 292.

If the system 232 is currently disarmed, the control portion 244 will arm the system 232 and cause the transducer 70 to emit a single chirp as indicated at step 294. The armed state is not actually activated until a predetermined delay period has passed, such as one minute, as indicated by step 296. The system 232 is armed when the unauthorized vehicle start box 56 and the driver entry box 52 are activated and ready as shown at step 298. In this condition, the control portion 244 is set to monitor the various conditions, as discussed above, when the system 232 is armed. If the system 232 senses that the vehicle has been entered, as indicated at step 300, while the system 232 is armed, the driver entry status box 52 will cause the transducer 70 to emit the soft chirp for one minute to notify the driver that the system 232 is armed, as indicated at step 302.

When in the armed state, the control portion 244 may detect a recent engine start, as indicated at step 304, and the engine is running, as indicated at step 306, as applied to the engine started recently status box 50 and discussed above. The unauthorized vehicle start status box will then proceed to disable the engine, as indicated at step 308. In this condition, the unauthorized vehicle start status box 56 will hold the unauthorized start while the recent engine start signal and the engine running signal are high, and will reset the reset clock to zero. The control portion 244 will also increment the counter 102, as indicated at step 310, and then determine if the counter 102 has reached a predetermined number of counts, as indicated by decision diamond 312. If the counter 102 has reached a value greater than the maximum count value, the control portion 244 then determines if the VES voltage is greater than six volts at decision diamond 314. If the VES voltage is greater than six volts, then the switch 234 is connected to the battery contact 236, and therefore the system 232 powers the coil 235 of the switch 234 for 25 ms to connect it to the disconnect contact 240 to disconnect the battery 12 as indicated at step 316. likewise, if the SOC algorithm has fallen to the minimum safe state of charge, and the engine is off, as indicated at step 318, the system 232 will again determine if the VES voltage is greater than six volts, at decision diamond 314, to determine the position of the switch 234, and if VES voltage is greater than six volts, will energize the coil 235 for 25 ms to connect the switch 234 to the disconnect contact 240 at step 316.

If the counter 102 has not reached the maximum count number, the control portion 244 powers the coil through the OR gate 246 in the manner as discussed above so that the switch 234 is connected to the VES contact 238 for a one second time period, when the clock pulse is low at step 320. After the control portion 244 switches the switch 234 on a low clock pulse, it then determines whether there is still an unauthorized vehicle start at decision diamond 322. If there is not an unauthorized vehicle start, then the control portion 244 causes the output of the AND gate 256 to go low at step 324. After a three second delay at step 326, the control portion 244 causes the system 232 to reconnect the battery 12 by connecting the switch 234 to the battery contact 236, as indicated at step 328. The system then proceeds to an armed state at the step 298.

If the control portion 244 determines that there is an unauthorized vehicle start at decision diamond 322, the control portion 244 then determines if the VES voltage is greater than nine volts after the 25 ms delay, as indicated by decision diamond 330. The step of decision diamond 330 determines if a second battery has been connected to the vehicle as would be the case of an attempted jump start of the vehicle. If the VES voltage is greater than nine volts, then a second battery probably has been connected to the vehicle, so the control portion 244 resets the counter 102 at step 332, and then proceeds to deenergize the coil at the step 324, and reconnect the switch 234 to the battery contact 236 at step 328 after the delay. If the VES voltage is not greater than nine volts after the 25 ms delay, indicating that there is not a second battery connected to the vehicle, the control portion 244 then determines if the reset clock is on a high clock pulse at decision diamond 334. If the clock pulse is not high, then the control portion 244 proceeds to ground the VES voltage by switching the switch 234 to be connected to the VES contact 238 while the coil is powered, at the step 320. If the clock pulse is high, the control portion 244 does not switch the switch 234, but determines if the engine is running and has been recently started at decision diamond 336. If the engine is running and has been recently started, the control portion 244 switches the switch 234 as discussed above at step 320. If the engine is not running and has not been recently started, the control portion 244 deenergizes the coil 235, and reconnects the switch 234 to the battery contact 236 at the step 328 after the three second delay.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention as defined in the following claims.

What is claimed is:

1. In a vehicle having an engine, a battery and an electrical system with an alternator that produces an alternator voltage, a improvement characterized by an anti-theft system to disable the engine for theft deterrent purposes, the anti-theft system comprising:

a resistive element;

a switch having a first position in which the electrical system is connected to the battery, a second position in which the electrical system is connected to the resistive element to electrically dissipate the alternator voltage through the resistive element and stall the engine, and a third position in which the electrical circuit is disconnected from both the battery and the resistive element; and a control system establishing an armed state and a disarmed state of the anti-theft system, the control system including a detection system that detects whether the engine is running and whether the engine has been recently started, the control system moving the switch into the second position to disconnect the battery from the electrical system and connect the resistive element to the electrical system when the engine is started while the anti-theft system is armed.

2. The anti-theft system according to claim 1 wherein the switch is an electromechanical switch having a coil, wherein the switch moves to the second position when the coil is energized.

3. The anti-theft system according to claim 1 wherein the switch is an electromechanical switch having a coil, wherein the switch moves to the second position when the coil is energized, and moves to one of the first position and the third position when the coil is deenergized, the switch moving from the first position to the third position when the switch is in the first position and the coil is energized and then deenergized, and the switch moves from the third position to the first position when the switch is in the third position and the coil is energized and then deenergized.

4. The anti-theft system according to claim 1 wherein the control system responds to the switch being in the third position when the anti-theft system is disarmed by causing the switch to move from the third position to the first position.

5. The anti-theft system according to claim 1 wherein the control system responds to the switch being in the third position when the anti-theft system is armed and an unauthorized vehicle start is not occurring, by causing the switch to move from the third position to the first position.

6. The anti-theft system according to claim 5 wherein the electrical system has a voltage and the control system determines if the switch is in the third position by measuring a voltage of the electrical system.

7. The anti-theft system according to claim 1 wherein the control system includes a counter that counts how many consecutive times the engine is disabled, the counter, upon reaching a predefined count value, provides an output signal that causes the switch to move from the first position to the third position, the control system determining whether the switch is in the third position prior to moving the switch, the control system resetting the counter when the anti-theft system is disarmed.

8. The anti-theft system according to claim 1 wherein the control system includes a low battery state of charge system that provides a signal that operates the switch from the first position to the third position when the battery state of charge decreases below a predetermined charge level, the control system determining whether the switch is in the third position prior to operating the switch in response to the low battery state of charge system.

9. The anti-theft system according to claim 1 wherein the control system includes a mechanism to sense whether a voltage of the electrical system is below a predetermined magnitude, the control system moving the switch from the second position when voltage does not decrease below the predetermined magnitude a predetermined period of time after the switch moved to the second position.

10. The anti-theft system according to claim 2 wherein the control system energizes the coil for a maximum time of about one second.

11. In a vehicle having an engine, a battery and an electrical system with an alternator that produces an alternator voltage, a improvement characterized by an anti-theft system to disable the engine for theft deterrent purposes, the anti-theft system comprising:

a resistive element;

an electro-mechanical switch including a coil, said switch having a first position in which the electrical system is connected to the battery, a second position in which the electrical system is connected to the resistive element to electrically dissipate the alternator voltage through the resistive element and stall the engine, and a third position in which the electrical circuit is disconnected from both the battery and the resistive element, wherein the switch is placed in the second position when the coil is energized and the switch is in one of the first and third positions when the coil is deenergized, said switch moving to the third position when the switch is in the first position and the coil is energized and then deenergized, and said switch moving to the first position when the switch is in the third position and the coil is energized and then deenergized; and a control system which selectively energizes the coil to move the switch from the first position to the second position when an unauthorized vehicle start is detected, thereby electrically disconnecting the vehicle battery from the electrical system and electrically connecting the resistive element to the electrical system to drain the alternator voltage.

12. The anti-theft system according to claim 11 wherein the control system energizes the coil for a maximum time of about one second.

13. The anti-theft system according to claim 11 wherein the control system establishes an armed state and a disarmed state of the anti-theft system, said control system including a detection system that detects whether a vehicle engine is running and whether the vehicle engine has been recently started, said control system energizing the coil when the anti-theft system is armed and the vehicle engine is running and has been recently started.

14. The anti-theft system according to claim 11 wherein the control system energizes the coil and then deenergizes the coil to move the switch from the third position to the first position when the anti-theft system is disarmed and the switch is in the third position.

15. The anti-theft system according to claim 11 wherein the control system energizes and then deenergizes the coil to move the switch from the third position to the first position if the anti-theft system is armed and an unauthorized vehicle start is not being detected, when the switch is in the third position.

16. The anti-theft system according to claim 11 wherein the control system includes a counter that counts how many consecutive times the engine is disabled, said control system energizing and then deenergizing the switch to actuate the switch from the third position to the first position upon reaching a predefined count value, said control system determining whether the switch is in the third position prior to energizing the coil.

17. The anti-theft system according to claim 11 wherein the control system includes a low battery state of charge system that determines if the battery state of charge falls below a predetermined charge level, said control system energizing the coil to move the switch from the first position to the third position when the battery state of charge falls below the predetermined charge level while the switch is in the first position.

18. The anti-theft system according to claim 11 wherein the control system determines whether a VES voltage of the electrical system is below a predetermined magnitude a predefined period of time after the coil is energized to move the switch to the second position, said control system moving the switch from the second position after the predefined period of time if the VES voltage is not below the predetermined magnitude.

19. An anti-theft system for disabling an engine of a vehicle for theft deterrent purposes the vehicle having a battery and an electrical system, said anti-theft system comprising:
 a resistive element electrically connected to a vehicle electrical system of the vehicle;
 a first set of switch contacts electrically connected to the resistive element and being opened and closed to disconnect and connect the resistive element to the vehicle electrical system; and
 a control system closing the first set of switch contacts to electrically dissipate a VES voltage of the vehicle electrical system through the resistive element to ground when the engine is started, said control system determining whether the VES voltage is below a predetermined level a predefined time after the first set of switch contacts is closed, said control system opening the first set of switch contacts if the VES voltage is not below the predetermined level.

20. The anti-theft system according to claim 19 further comprising a second set of switch contacts electrically connecting and disconnecting a vehicle battery to the electrical system, said control system opening the second set of switch contacts to electrically disconnect the vehicle battery when the anti-theft system is armed and the engine is started and running.

21. An anti-theft system for disabling an engine of a vehicle for theft deterrent purposes the vehicle having a battery and an electrical system, said anti-theft system comprising:
 a first set of switch contacts being electrically connected to the battery and being closed to connect the battery to the electrical system and being opened to disconnect the battery;
 a resistive element;
 a second set of switch contacts electrically connected to the resistive element and being closed to connect the resistive element to the electrical system and being opened to disconnect the resistive element; and
 a control system establishing an armed state and a disarmed state of the anti-theft system, said control system including a detection system that detects whether the engine is running and whether the engine has been recently started, said control system opening the first set of switch contacts to electrically disconnect the vehicle battery and closing the second set of switch contacts to electrically connect the electrical system to ground through the resistive element when the engine is started while the anti-theft system is armed.

22. The anti-theft system according to claim 21 wherein the detection system includes a voltage sensor that measures a VES voltage of the electrical system, said control system providing an output signal indicating that the engine has been recently started when the VES voltage decreases below a predetermined value.

23. The anti-theft system according to claim 21 wherein the detection system includes a vibration sensor that detects vibrations of the vehicle and a voltage sensor that measures the VES voltage of the electrical system.

24. The anti-theft system according to claim 23 wherein the voltage sensor provides a first output signal indicative of fluctuations of the VES voltage and a second output signal when the VES voltage goes above a predetermined level, and wherein the vibration sensor provides an vibration signal indicative of vibrations of the vehicle, said control system generating a first engine running output signal when at least two of the first output signal, the second output signal, and the vibration signal are present.

25. The anti-theft system according to claim 24 wherein the voltage sensor provides a third output signal when the VES voltage goes below a predefined level, said control system generating a second engine running output signal either when the first output signal, the second output signal, and the vibration signal are all present, or when the third output signal is present.

26. The anti-theft system according to claim 25 wherein the control system generates an engine recently started signal in response to a combination of the first and second engine running output signals.

27. The anti-theft system according to claim 21 wherein the control system includes a low battery state of charge system that provides a signal that opens the first set of switch contacts when the battery state of charge falls below a predetermined charge level.

28. The anti-theft system according to claim 21 wherein the control system includes a driver entry system, said driver entry system being responsive to a vibration signal from a vibration sensor that indicates a person has entered the vehicle, and to a voltage drop signal from a voltage sensor indicating a defined decrease in a voltage of the electrical system, said driver entry system providing a signal indicating that the anti-theft system is armed in response to either the vibration signal or the voltage drop signal.

* * * * *